US009002094B2

(12) United States Patent
Hirota

(10) Patent No.: US 9,002,094 B2
(45) Date of Patent: Apr. 7, 2015

(54) IMAGE PROCESSING DEVICE AND IMAGE PROCESSING METHOD

(71) Applicant: Keyence Corporation, Osaka (JP)

(72) Inventor: Aruto Hirota, Osaka (JP)

(73) Assignee: Kenyence Corporation, Osaka (JP)

( * ) Notice: Subject to any disclaimer, the term of this patent is extended or adjusted under 35 U.S.C. 154(b) by 87 days.

(21) Appl. No.: 13/684,652

(22) Filed: Nov. 26, 2012

(65) Prior Publication Data
US 2013/0170731 A1 Jul. 4, 2013

(30) Foreign Application Priority Data

Dec. 28, 2011 (JP) ................. 2011-289942

(51) Int. Cl.
G06K 9/00 (2006.01)
G06T 7/00 (2006.01)

(52) U.S. Cl.
CPC ............... G06T 7/0002 (2013.01); G06K 9/00 (2013.01); G06T 7/001 (2013.01); G06T 2207/30164 (2013.01)

(58) Field of Classification Search
CPC ............... H01J 2237/2817; H01J 2237/24592; H01J 37/20; H01J 37/244; G01N 21/956; G01N 2021/936; G01N 21/9501; G06K 9/32; G06K 9/6211; G06K 9/325; G06K 9/2054; G06K 9/4647; G06T 7/0085; G06T 7/001; G06T 2207/30168; G06T 7/0002; G06T 7/003; G06T 2207/30148; G02B 19/0085; G02B 6/4227; G01B 11/005; G01M 11/0278; G01M 11/0264; G07C 3/14; A61B 1/05; H04N 1/00039; H04N 1/00068; G03F 7/70616; G03F 7/7065

USPC ................. 382/141, 154, 275, 286, 100, 144; 356/511, 513, 394
See application file for complete search history.

(56) References Cited

U.S. PATENT DOCUMENTS 5,774,222 A * 6/1998 Maeda et al. ................. 356/394
5,830,612 A * 11/1998 Yamada et al. ................. 430/30
6,215,898 B1 * 4/2001 Woodfill et al. .............. 382/154
6,980,690 B1 * 12/2005 Taylor et al. .................. 382/154
7,567,702 B2 * 7/2009 Woodfill et al. .............. 382/154
7,752,594 B2 * 7/2010 Takeda et al. ................... 716/51
8,290,296 B2 * 10/2012 Wu et al. ....................... 382/275
8,515,153 B2 * 8/2013 Sugiyama et al. ............ 382/141

(Continued)

FOREIGN PATENT DOCUMENTS

JP 2001-045340 2/2001
JP 2003-244579 8/2003

(Continued)

Primary Examiner — Vu Le
Assistant Examiner — Aklilu Woldemariam
(74) Attorney, Agent, or Firm — Kilyk & Bowersox, P.L.L.C.

(57) ABSTRACT

A reference image to serve as a reference for a non-defective determination is previously stored in association with identification information for identifying an inspection object. An image of the inspection object is displayed side by side with the reference image of corresponding identification information. A drawn position of the reference image and a drawn position of the acquired image are aligned, adjustment is made so as to make brightness of the reference image coincide with brightness of the acquired image, and adjustment is made so as to make a focus on the reference image coincide with a focus on the acquired image. Adjustment is made so as to make a focus of the reference image coincide with a focus of the acquired image.

15 Claims, 12 Drawing Sheets

(56) References Cited

U.S. PATENT DOCUMENTS

| | | | |
|---|---|---|---|
| 2002/0113967 A1* | 8/2002 | Nara et al. | 356/394 |
| 2003/0185462 A1* | 10/2003 | Hsieh | 382/286 |
| 2006/0210146 A1* | 9/2006 | Gu | 382/154 |
| 2008/0008379 A1* | 1/2008 | Andel et al. | 382/141 |
| 2008/0175466 A1* | 7/2008 | Ishikawa | 382/141 |
| 2009/0195788 A1* | 8/2009 | Dosaka et al. | 356/511 |
| 2011/0091065 A1* | 4/2011 | Chandrashekar et al. | 382/100 |

FOREIGN PATENT DOCUMENTS

| | | |
|---|---|---|
| JP | 2005-227931 | 8/2005 |
| JP | 2008-206138 | 9/2008 |
| JP | 2011-054071 | 3/2011 |

* cited by examiner

IMAGE PROCESSING DEVICE AND IMAGE PROCESSING METHOD

CROSS-REFERENCE TO RELATED APPLICATIONS

The present application claims foreign priority based on Japanese Patent Application No. 2011-289942, filed Dec. 28, 2011, the contents of which is incorporated herein by reference.

BACKGROUND OF THE INVENTION

1. Field of the Invention

The present invention relates to an image processing device and an image processing method which reproduce, at the time of performing product inspection, an imaging environment for imaging an inspection object as a similar environment to an imaging environment where a reference image has been obtained by imaging, based on a result of image processing.

2. Description of Related Art

In the case of making a defective/non-defective determination on a product by use of an image processing sensor, an image obtained by imaging an inspection object is compared with a reference image, to determine whether the product is defective or non-defective. Specifically, parameter information such as threshold information for making a defective/non-defective determination is shared by an image processing sensor on a manufacturing line, to determine whether the product is defective or non-defective based on a common determination standard.

Further, an imaging condition may be changed according to circumstances. For example, Japanese Unexamined Patent Publication No. 2005-227931 discloses an image processing device that performs imaging while changing an imaging condition such as a shutter speed in accordance with an imaged site or an imaged range of the inspection object.

However, in the case of imaging the inspection object in practice, even when imaging is performed on the same imaging conditions, the same image cannot necessarily be obtained by imaging due to a difference in a state of illumination, a mounted position of an imaging device, displacement of its posture, adjustment of a diaphragm or a focus of a lens, or the like. Therefore, despite the imaging condition being the same, there has been a problem of not being able to make a defective/non-defective determination due to displacement of a position for detecting a characteristic portion, not being able to recognize the characteristic portion due to the acquired image being dark or bright, not being able to specify the characteristic portion due to displacement of a focus, or the like.

SUMMARY OF THE INVENTION

The present invention has been made in view of such circumstances, and an object thereof is to provide an image processing device and an image processing method which reproduce an imaging environment for imaging an inspection object as an environment similar to an imaging environment in which a reference image has been obtained by imaging, based on a result of image processing.

In order to achieve the above object, according to one embodiment of the invention, there is provided an image processing device which is connected with an imaging unit (part) for imaging an inspection object, and performs imaging processing on image data captured (obtained) by imaging by the imaging unit (part), to make a defective/non-defective determination on the inspection object based on a result of the image processing, the device including a reference image storing unit (part) for storing a reference image to serve as a reference for a non-defective determination in association with identification information for identifying the inspection object; an image displaying unit (part) for acquiring an image of the inspection object, to display the acquired image side by side with the reference image of corresponding identification information; an alignment unit (part) for aligning a drawn position of the reference image and a drawn position of the acquired image; a brightness adjustment unit (part) for performing adjustment so as to make brightness of the reference image coincide with (agree with) brightness of the acquired image; and a focus adjustment unit (part) for performing adjustment so as to make a focus on the reference image coincide with (agree with) a focus on the acquired image.

Further, according to another embodiment of the invention, in the image processing device according to the first aspect, grid lines are superimposed and displayed on the displayed reference image, and the alignment unit (part) moves the grid lines over a characteristic portion of the reference image, and superimposes and displays grid lines on the acquired image at the same coordinates.

Further, according to still another embodiment of the invention, in the image processing device according to the first aspect, a contour line for contouring is superimposed and displayed on the displayed reference image, and the alignment unit (part) displays the contour line over a characteristic portion of the reference image, and superimposes and displays a contour on the acquired image at the same coordinates.

Further, according to still another embodiment of the invention, in the image processing device according to any one of the first to third aspects, the brightness adjustment unit (part) divides the acquired image into a plurality of even regions, and superimposes and displays on the acquired image a magnitude correlation between an average pixel value of each of the regions and an average pixel value of each of regions in the reference image.

Further, according to still another embodiment of the invention, in the image processing device according to any one of the first to fourth aspects, the focus adjustment unit (part) respectively generates enlarged images obtained by enlarging characteristic portions of the acquired image and the reference image, and performs adjustment so as to make edge strength of the enlarged image of the acquired image coincide with (agree with) edge strength of the enlarged image of the reference image.

Further, according to still another embodiment of the invention, the image processing device according to any one of the first to fifth aspects includes a position fine-adjustment unit (part) for respectively generating enlarged images obtained by enlarging characteristic portions of the acquired image and the reference image, and aligning a drawn position of the reference image and a drawn position of the acquired image based on the generated enlarged images.

Next, in order to achieve the above object, according to still another embodiment of the invention, there is provided an image processing method which is executable by an image processing device, which is connected with an imaging unit (part) for imaging an inspection object, and performs imaging processing on image data obtained by imaging by the imaging unit (part), to make a defective/non-defective determination on the inspection object based on a result of the image processing, the method including the steps of: storing a reference image to serve as a reference for a non-defective determination in association with identification information for identifying the inspection object; acquiring an image of the inspection object, to display the acquired image side by side with the reference image of corresponding identification information; aligning a drawn position of the reference image and a drawn position of the acquired image; performing adjustment so as to make brightness of the reference image coincide with (agree with) brightness of the acquired image; and performing adjustment so as to make a focus on the reference image coincide with (agree with) a focus on the acquired image.

Further, according to still another embodiment of the invention, in the image processing method according to the seventh aspect, in the image processing device, grid lines are superimposed and displayed on the displayed reference image, and the grid lines are moved over a characteristic portion of the reference image, and grid lines are superimposed and displayed on the acquired image at the same coordinates.

Further, according to still another embodiment of the invention, in the image processing method according to the seventh aspect, in the image processing device, a contour line for contouring is superimposed and displayed on the displayed reference image, and the contour line is displayed over a characteristic portion of the reference image, and a contour is superimposed and displayed on the acquired image at the same coordinates.

Further, according to still another embodiment of the invention, in the image processing method according to any one of the seventh to ninth aspects, in the image processing device, the acquired image is divided into a plurality of even regions, and a magnitude correlation between an average pixel value of each of the regions and an average pixel value of each of regions in the reference image is superimposed and displayed on the acquired image.

Further, according to still another embodiment of the invention, in the image processing method according to any one of the seventh to tenth aspects, in the image processing device, enlarged images obtained by enlarging characteristic portions of the acquired image and the reference image are respectively generated, and adjustment is performed so as to make edge strength of the enlarged image of the acquired image coincide with (agree with) edge strength of the enlarged image of the reference image.

Further, according to still another embodiment of the invention, in the image processing method according to any one of the seventh to eleventh aspects, in the image processing device, enlarged images obtained by enlarging characteristic portions of the acquired image and the reference image are respectively generated, and a drawn position of the reference image and a drawn position of the acquired image are aligned based on the generated enlarged images.

In the first and seventh aspects, a reference image to serve as a reference for a non-defective determination is previously stored in association with identification information for identifying an inspection object. An image of the inspection object is acquired, and displayed side by side with the reference image of corresponding identification information. A drawn position of the reference image and a drawn position of the acquired image are aligned, adjustment is made so as to make brightness of the reference image coincide with (agree with) brightness of the acquired image, and adjustment is made so as to make a focus on the reference image coincide with (agree with) a focus on the acquired image. Accordingly, even in a case where there is a difference in a state of illumination, a mounted position of an imaging device, displacement of its posture, adjustment of a diaphragm or a focus of a lens, or the like, from the time when the reference image has been obtained by imaging, it is possible to reliably reproduce the imaging environment of the time when the reference image has been obtained by imaging, so as to make a defective/non-defective determination with high accuracy on the inspection object.

In the second and eighth aspects, grid lines are superimposed and displayed on the displayed reference image, and the grid lines are moved over a characteristic portion of the reference image, while grid lines are superimposed and displayed on the acquired image at the same coordinates. Accordingly, it is possible to grasp positional displacement of the inspection object by checking displacement from the grid lines, so as to perform alignment of a drawn position of the acquired image with high accuracy.

In the third and ninth aspects, a contour line for contouring is superimposed and displayed on the displayed reference image, and the contour line is displayed over a characteristic portion of the reference image and displayed, while a contour line is superimposed and displayed on the acquired image at the same coordinates. Accordingly, it is possible to grasp positional displacement of the inspection object by checking displacement from the contour line, so as to perform alignment of a drawn position of the acquired image with high accuracy.

In the fourth and tenth aspects, since the acquired image is divided into a plurality of even regions, and a magnitude correlation between an average pixel value of each of the regions and an average pixel value of each of regions in the reference image are superimposed and displayed on the acquired image, it is possible to visually check in which region the brightness is excessively large or excessively small, so as to adjust the brightness with high accuracy.

In the fifth and eleventh aspects, enlarged images obtained by enlarging characteristic portions of the acquired image and the reference image are respectively generated, and adjustment is made so as to make edge strength of the enlarged image of the acquired image coincide with (agree with) edge strength of the enlarged image of the reference image, whereby it is possible to perform focusing with the edge strength regarded as an index so as to perform focus adjustment with high accuracy.

In the sixth and twelfth aspects, enlarged images obtained by enlarging characteristic portions of the acquired image and the reference image are respectively generated, and a drawn position of the reference image and a drawn position of the acquired image are aligned based on the generated enlarged images, whereby it is possible to perform alignment with high accuracy.

In the present invention, even in a case where there exists a difference in a state of illumination, a mounted position of an imaging device, displacement of its posture, adjustment of a diaphragm or a focus of a lens, or the like, from the time when the reference image has been obtained by imaging, it is possible to reliably reproduce the imaging environment which is one at the time when the reference image has been obtained by imaging, so as to make a defective/non-defective determination with high accuracy on the inspection object.

DETAILED DESCRIPTION OF PREFERRED EMBODIMENTS

Hereinafter, an embodiment of the present invention will be described with reference to the drawings. It is to be noted that elements having the same or similar configurations or functions throughout the drawings referenced in descriptions of the present embodiment are provided with the same or similar numerals, and detailed descriptions thereof will be omitted.

Figure 1:
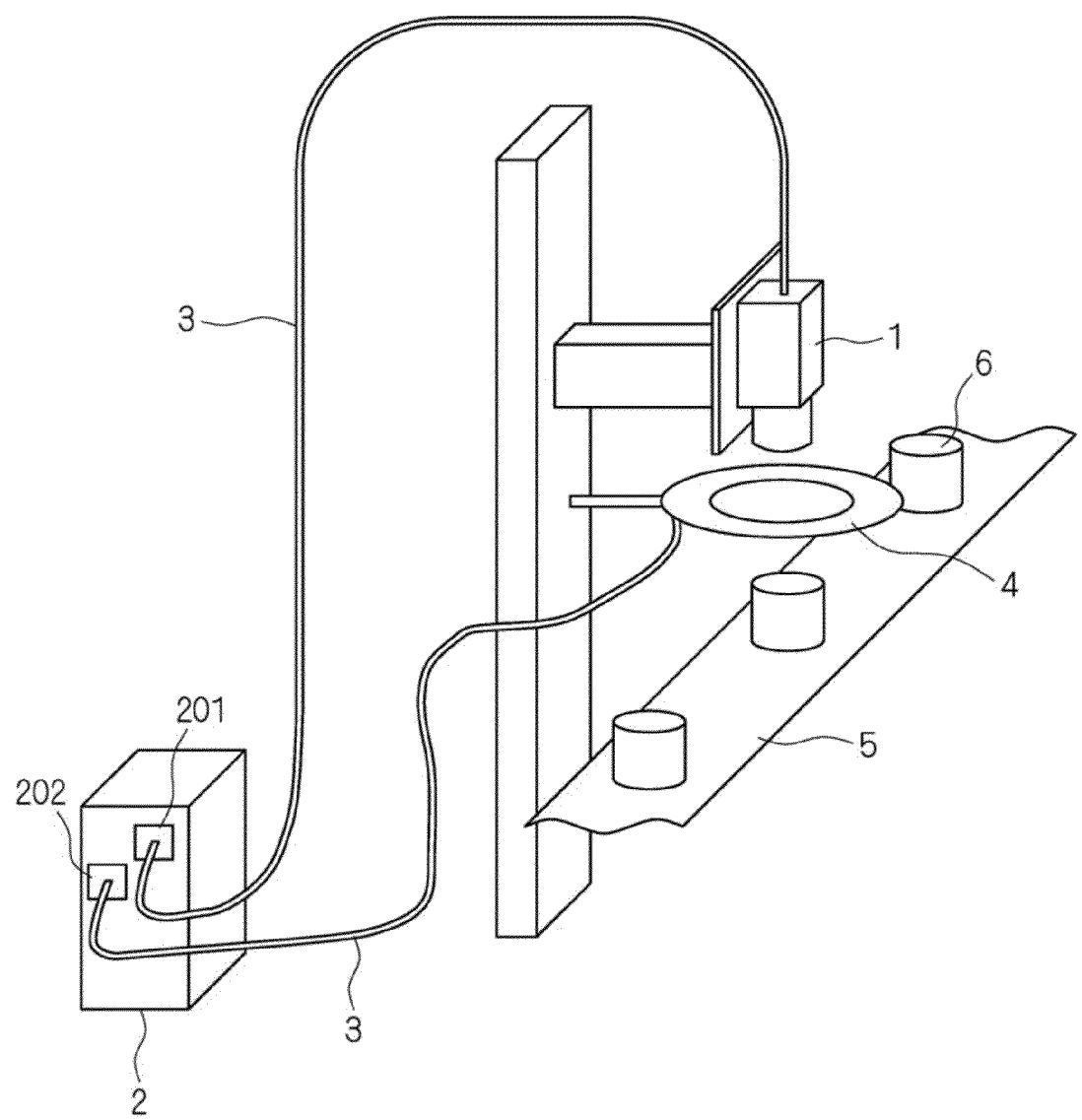
FIG. 1 is a schematic view showing a configuration of an image processing sensor including an image processing device according to an embodiment of the present invention.

FIG. 1 is a schematic view showing a configuration of an image processing sensor including an image processing device according to an embodiment of the present invention. As shown in FIG. 1, the image processing sensor according to the present embodiment is configured by an imaging device (imaging part) 1 and an image processing device 2 connected with the imaging device 1 through a connection cable 3 in a data communicable manner. The image processing device 2 is connected with a display device (not shown), and incorporates therein an image processing controlling part 201 and an illumination controlling part 202.

Further, the illumination controlling part 202 is connected with an illumination device 4 through the connection cable 3 in a data communicable manner. An inspection object 6 moving on a conveyor belt 5 is irradiated with light by the illumination device 4, to image the imaging device 1. Based on an image obtained by imaging the inspection object 6, it is determined whether the inspection object 6 is defective or non-defective.

The imaging device 1 includes therein an FPGA, a DSP, or the like for performing image processing, and includes a camera module having an imaging element for imaging the inspection object 6. A CMOS substrate is provided as the imaging element, and for example, a color image obtained by imaging is converted to an HDR image by the CMOS substrate based on its conversion characteristic of expanding a dynamic range.

Figure 2:
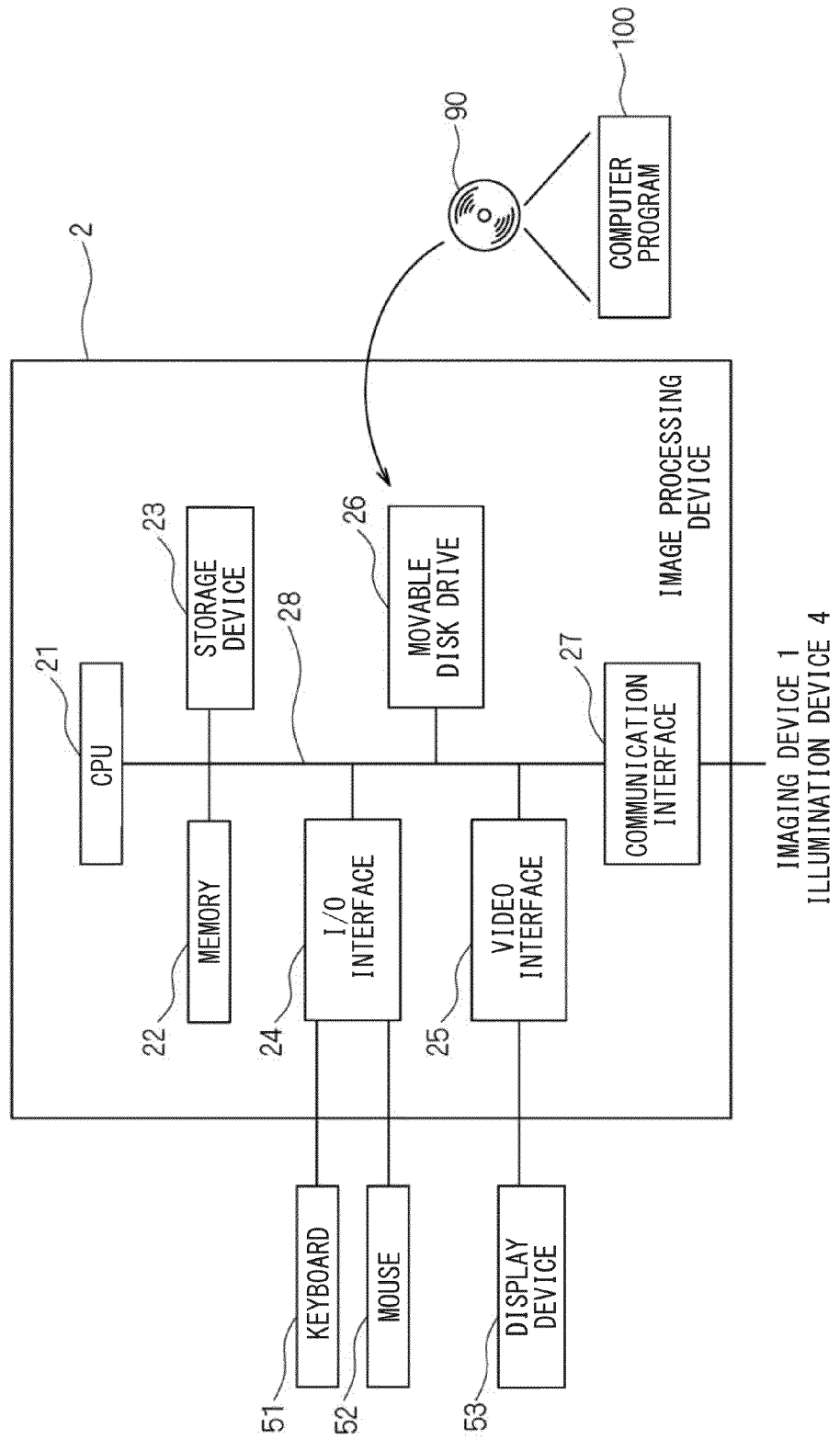
FIG. 2 is a block diagram showing a configuration of the image processing device according to the embodiment of the present invention.

FIG. 2 is a block diagram showing a configuration of the image processing device 2 according to the embodiment of the present invention. The image processing device 2 according to the embodiment of the present invention is at least configured by a CPU (Central Processing Unit) 21, a memory 22, a storage device 23, an I/O interface 24, a video interface 25, a movable disk drive 26, a communication interface 27, and an internal bus 28 for connecting the above-described hardware.

The CPU 21 is connected with each part of the hardware of the image processing device 2 as thus described through the internal bus 28, and controls an operation of each part of the above-described hardware, while executing a variety of software-based functions in accordance with a computer program 100 stored in the storage device 23. The memory 22 is configured by a volatile memory such as an SRAM, an SDRAM, or the like and developed with a load module at the time of execution of the computer program 100, and stores temporary data and the like generated at the time of execution of the computer program 100.

The storage device 23 is configured by a built-in fixed-type storage device (hard disk), a ROM, or the like. The computer program 100 stored in the storage device 23 is downloaded from a movable recording medium 90 like a DVD, a CD-ROM, or the like, where information such as a program and data is recorded, to the movable disk drive 26, and at the time of execution, the computer program 100 is developed from the storage device 23 to the memory 22 and then executed. Naturally, it may be a computer program downloaded from an external computer connected through the communication interface 27.

The communication interface 27 is connected to the internal bus 28, and can transmit and receive data to and from the imaging device 1, the illumination device 4, the external computer, and the like by being connected to an external network such as the Internet, a LAN, or a WAN.

The I/O interface 24 is connected with input devices such as a keyboard 51 and a mouse 52, and accepts an input of data. The video interface 25 is connected to a display device 53 such as a CRT display or a liquid crystal display, and displays a predetermined image.

Figure 3:
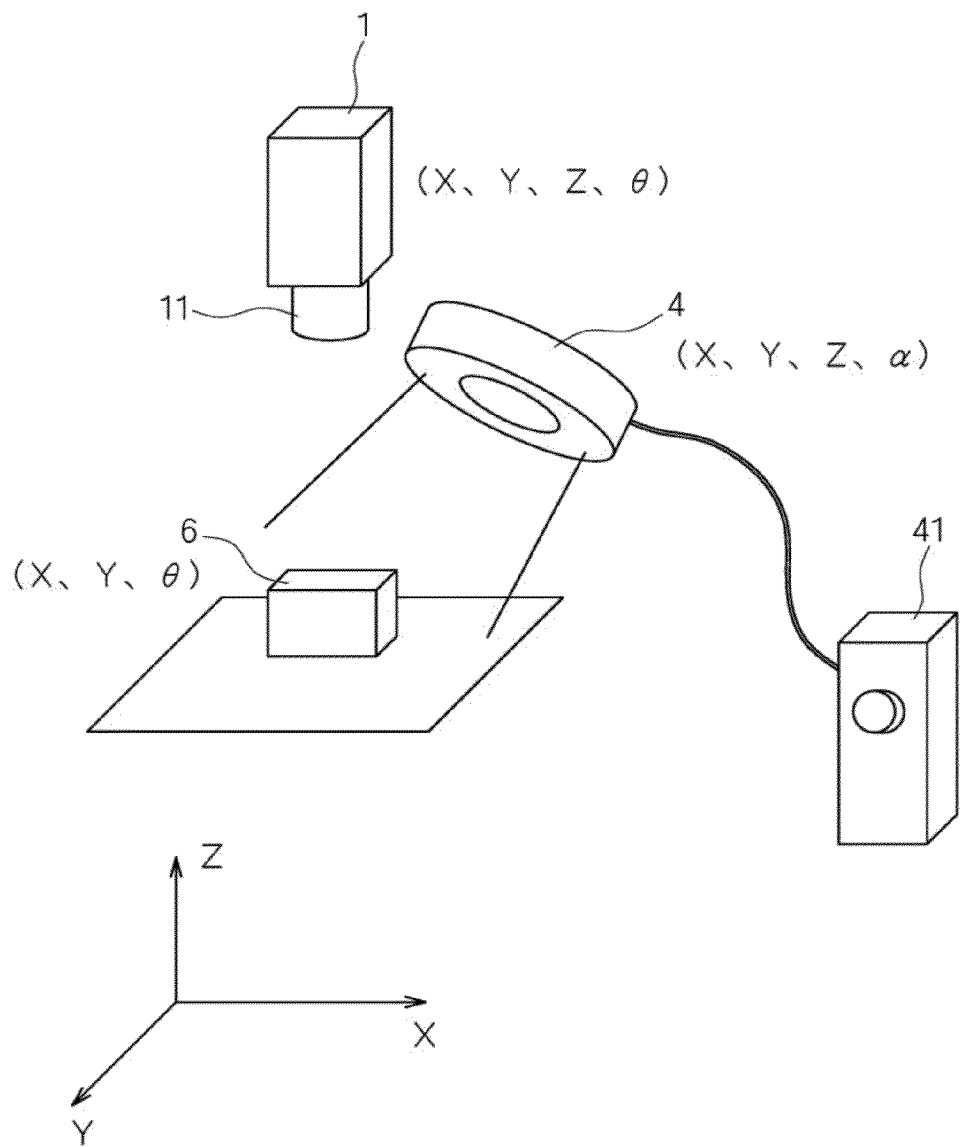
FIG. 3 is a schematic view showing parameters that set an imaging environment for the image processing sensor including an image processing device according to an embodiment of the present invention.

FIG. 3 is a schematic view showing parameters that set an imaging environment for the image processing sensor including the image processing device 2 according to the embodiment of the present invention. As shown in FIG. 3, the image processing sensor according to the present embodiment can adjust a positional coordinate (X, Y, Z) of the imaging device 1 and a swinging tilt angle θ thereof on the XY plane as parameters to be adjusted. Further, the imaging device 1 can adjust a focus and brightness. Specifically, the focus is adjusted by a focus ring, and the brightness is adjusted by an aperture ring.

Similarly, it is possible to adjust a positional coordinate (X, Y) of the inspection object 6 and a swinging tilt angle θ thereof on the XY plane as parameters to be adjusted. Since the inspection object 6 is placed on a mount, it does not have a moving function on the Z-axis direction.

Further, as for the illumination device 4, a positional coordinate (X, Y, Z) and an irradiation angle α of the illumination device 4 can be adjusted, and illumination can also be adjusted through the illumination controller 41. By adjustment of these, an image similar to a reference image stored in the storage device 23 can be obtained by imaging.

Figure 4:
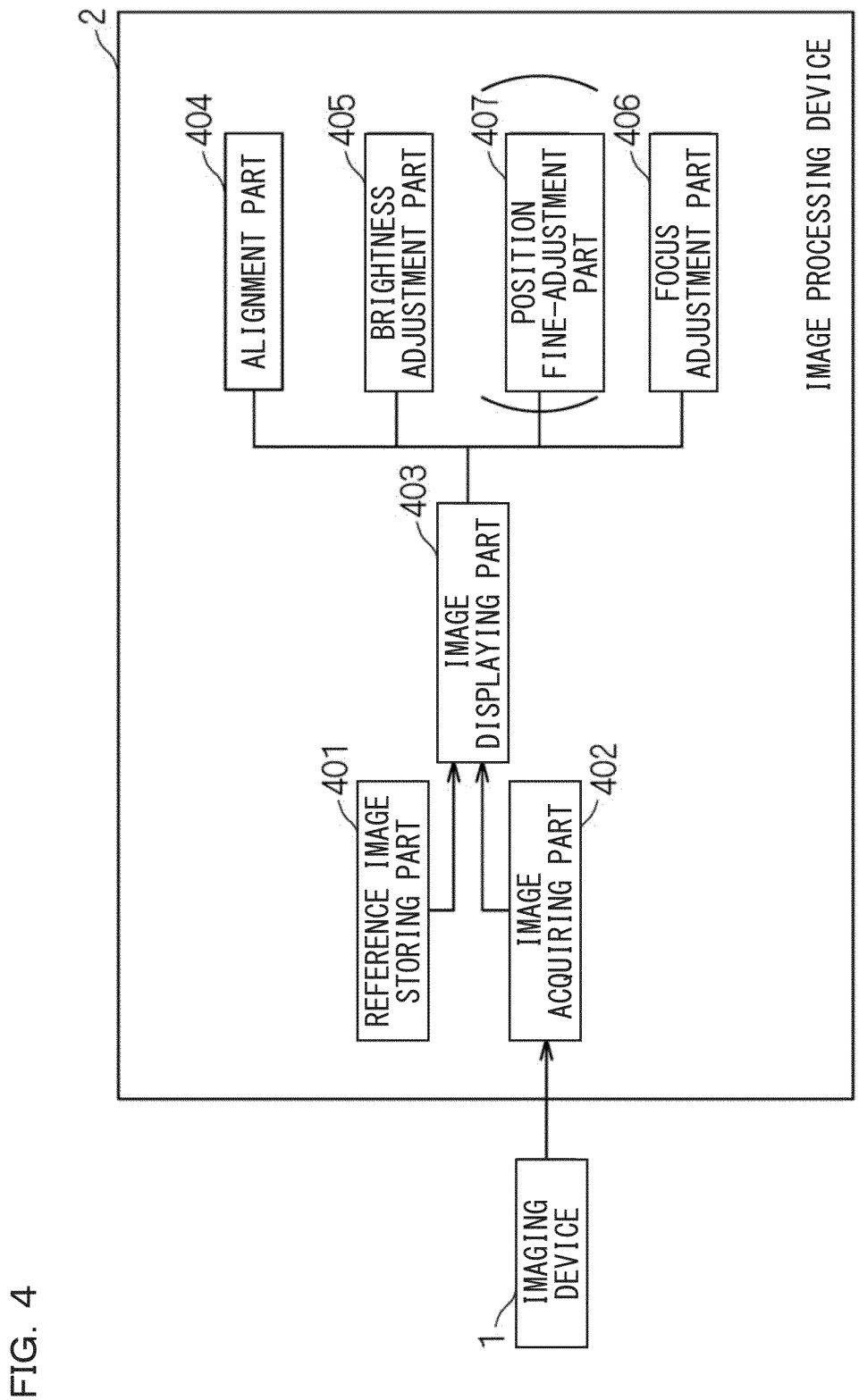
FIG. 4 is a functional block diagram of the image processing device according to the embodiment of the present invention.

FIG. 4 is a functional block diagram of the image processing device 2 according to the embodiment of the present invention. A reference image storing part 401 stores a reference image to serve as a reference for a non-defective determination into the storage device 23 in association with identification information for identifying the inspection object 6. One or a plurality of reference images may be stored with respect to one inspection object 6.

An image acquiring part 402 acquires an image of the inspection object 6 which has been obtained by imaging by the imaging device 1. An image displaying part 403 displays the acquired image of the inspection object 6 and the reference image of corresponding identification information side by side. Displaying the image of the inspection object 6 and the reference image of the inspection object 6 side by side allows comparison of a difference in imaging condition or the like between these two images.

An alignment part 404 aligns a drawn position of the reference image and a drawn position of the acquired image. For alignment of the drawn position of the reference image and the drawn position of the acquired image, there may be used horizontal and vertical grid lines displayed over a characteristic portion of the reference image, or a contour line displayed as a contour of the characteristic portion of the reference image.

A brightness adjustment part 405 performs adjustment so as to make the brightness of the reference image coincide with the brightness of the acquired image. The brightness adjustment part 405, for example, divides the acquired image of the inspection object 6 into 25 even regions and determines a magnitude correlation between an average pixel value of each divided region and an average pixel value of each region in the reference image, to superimpose and display a determination result on the acquired image of the inspection object 6.

A focus adjustment part 406 performs adjustment so as to make the focus of the reference image agree with the focus of the acquired image. The focus adjustment part 406 respectively generates enlarged images obtained by enlarging characteristic portions of the acquired image of the inspection object 6 and the reference image, and performs adjustment so as to make edge strength of the enlarged image of the acquired image agree with edge strength of the enlarged image of the reference image.

It is to be noted that a position fine-adjustment part 407 for finely adjusting the drawn position may be provided after brightness is adjusted by the brightness adjustment part 405. The position fine-adjustment part 407 respectively generates enlarged images obtained by enlarging characteristic portions of the acquired image of the inspection object 6 and the reference image, and aligns the drawn position of the reference image and the drawn position of the acquired image based on the generated enlarged images.

Figure 5:
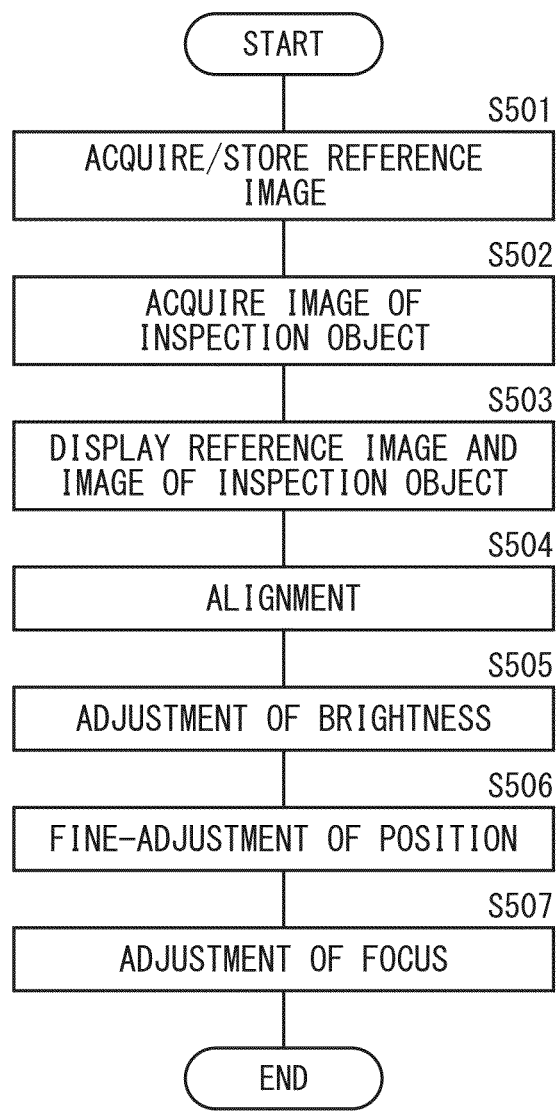
FIG. 5 is a flowchart showing a processing procedure for a CPU of the image processing device according to the embodiment of the present invention.

FIG. 5 is a flowchart showing a processing procedure for the CPU 21 of the image processing device 2 according to the embodiment of the present invention. In FIG. 5, the CPU 21 of the image processing device 2 acquires a reference image to serve as a reference for a defective/non-defective determination, and stores the reference image into the storage device 23 (step S501).

Figure 6:
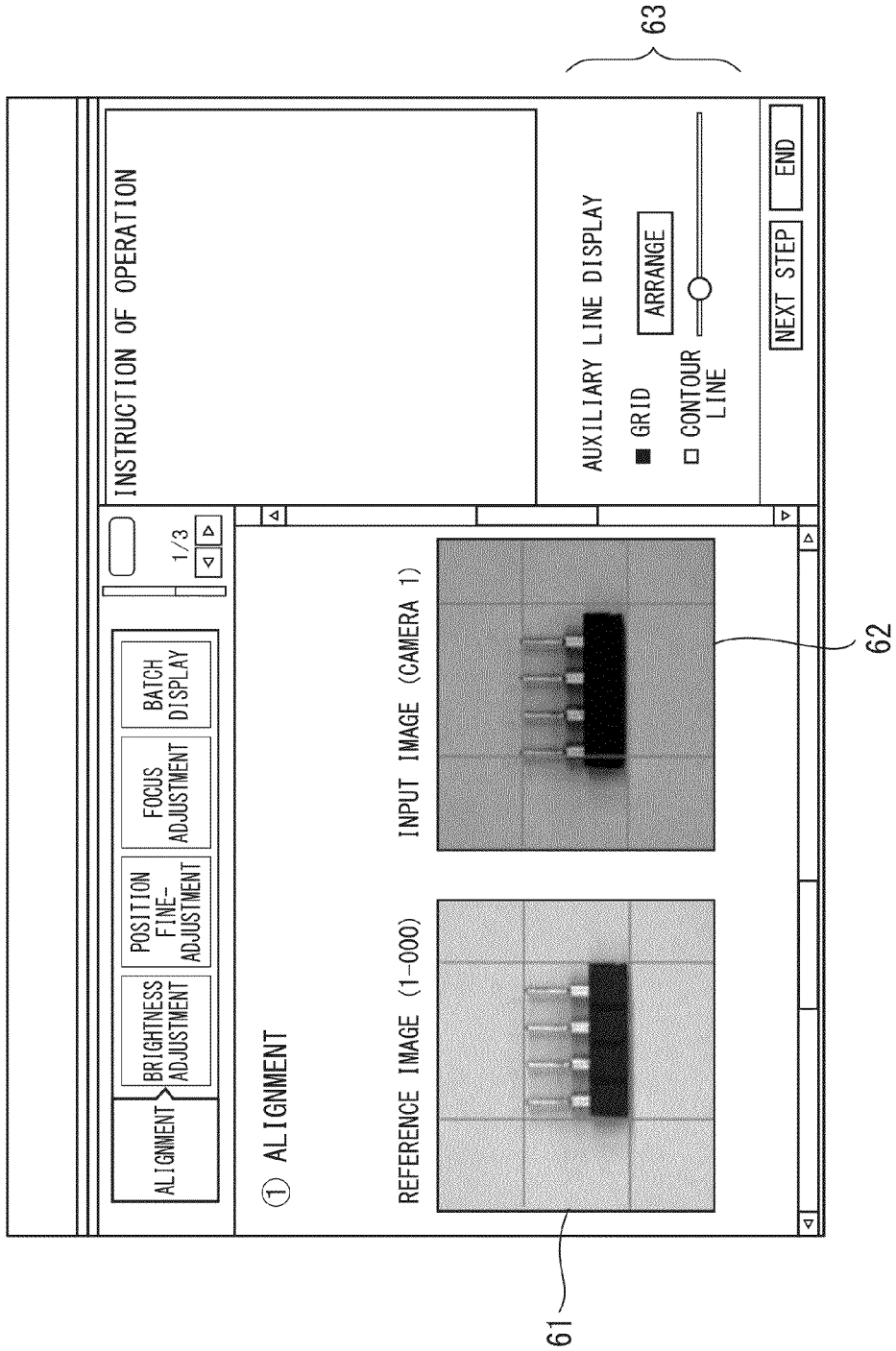
FIG. 6 is an exemplary view of an initial screen for aligning a stored reference image and an acquired input image.

The CPU 21 acquires an image of the inspection object 6 (step S502) and displays the acquired image side by side with the stored reference image in the display device 53 (step S503). FIG. 6 is a screen image view of an alignment screen of the image processing device 2 according to the embodiment of the present invention.

In FIG. 6, the reference image is displayed in a reference image displaying part 61 and the acquired image of the inspection object 6 is displayed in an input image displaying part 62. When both images are images obtained by imaging in the same environment, there should be agreement therebetween in terms of position of the inspection object 6 in the image, brightness of a background image, focus, and the like. Normally, however, the two images do not agree in these terms since a variety of ambient environments are different.

Returning to FIG. 5, the CPU 21 of the image processing device 2 aligns the drawn position of the reference image and the drawn position of the acquired image (step S504). For alignment of the drawn position of the reference image and the drawn position of the acquired image, horizontal and vertical grid lines displayed over a characteristic portion of the reference image, or a contour line displayed as a contour of the characteristic portion of the reference image, are used as auxiliary lines for alignment.

Although not shown, generally, two or more imaging devices 1 are connected to one image processing device 2, and an image acquired from each of the imaging devices 1 is subjected to image inspection in the image processing device 2 based on an image processing flow that has been set in the individual imaging device 1. For this reason, each reference image is set and stored in association with the image processing flow for image inspection which has been set with respect to each channel connected with the imaging device 1.

FIG. 6 is an exemplary view of an initial screen for aligning a stored reference image and an acquired input image. Although not shown, a screen is provided, before display of the screen of FIG. 6, for allowing the user to select, when the image processing device 2 recognizes that a plurality of imaging devices 1 are connected to the image processing device 2 or that a plurality of image processing flows are held in the image processing device 2, a reference image with respect to which imaging device 1 or which image processing flow is to be aligned with the acquired input image. Herein, when the user selects one imaging device 1 or the image processing flow, a reference image stored in association with the selected imaging device 1 or image processing flow is read out from the storage device 23, and the initial screen shown in FIG. 6 is displayed. Meanwhile, a moving image obtained by imaging in the imaging device 1 selected by the user is displayed as an input image on the right side of FIG. 6.

In the example of FIG. 6, a reference image displaying part 61 that reads out and displays a reference image stored in the storage device 23 is displayed on the left side, and an input image displaying part 62 that displays an input image acquired from the imaging device 1 is displayed on the right side. Further, an auxiliary line specifying unit 63 exists as a function for facilitating alignment between the reference image and the input image. The auxiliary line specifying unit 63 can accept selection of "grid" or "contour line". Selection of either one may be accepted, or selection of both may be accepted.

When the selection of "grid" is accepted, in positions of two-dimensional coordinates including specific X-coordinate and Y-coordinate which have been set with respect to the reference image displaying part 61 and the input image displaying part 62, at least a total of four grid lines, which are at least two lines parallelly extending in the respective coordinate directions, are displayed as initial set positions. It goes without saying that the grid lines are displayed at the same coordinate positions in the reference image displaying part 61 and the input image displaying part 62. Further, the "contour line" is a function to detect a contour of the characteristic portion of the inspection object 6 which is displayed in the reference image displaying part 61 and the input image displaying part 62 by edging processing or the like, and displays the detected contour lines. It is to be noted that a position and an angle of the grid line can be freely changed by an operation of the mouse 52 or the like.

Figure 7A:
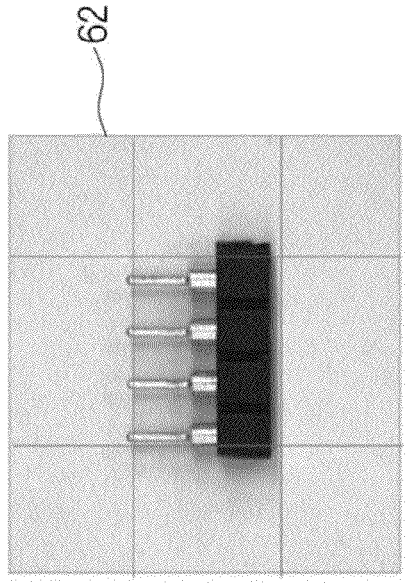
FIGS. 7A to 7D are exemplary views of a positional displacement checking operation for alignment using grid lines.
Figure 7B:
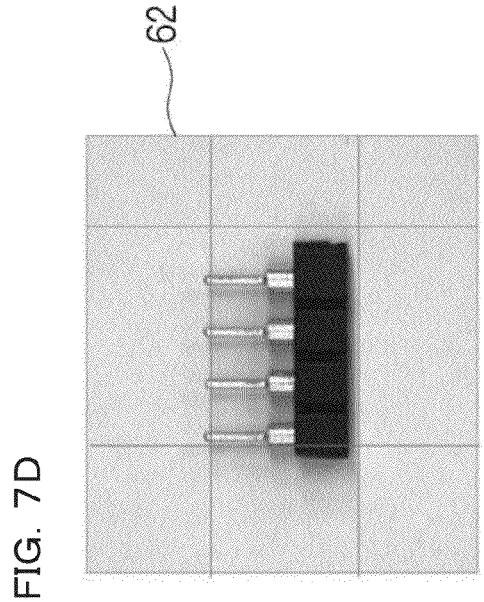

FIGS. 7A to 7D are exemplary views of a positional displacement checking operation for alignment using grid lines. As shown in FIG. 7A, in the reference image displaying part 61, grid lines are superimposed and displayed on an image of the inspection object 6. For simplifying the description, positions of the grid lines in an X-axis direction agree with positions of the upper and lower ends of the inspection object 6, and a position of only the left side of the grid lines in a Y-axis direction agrees with a position of the left end of the inspection object 6.

The grid lines are also linked to and displayed in the input image displaying part 62. That is, grid lines are also displayed in FIG. 7B at the same coordinates as in FIG. 7A. When the grid lines are moved within the reference image displaying part 61 (FIG. 7A), the grid lines within the input image displaying part 62 (FIG. 7B) move likewise, and conversely, when the grid lines are moved within the input image displaying part 62 (FIG. 7B), the grid lines within the reference image displaying part 61 (FIG. 7A) move likewise. That is, the CPU 21 of the image processing device 2 recognizes coordinate positions of the grid lines displayed in the reference image displaying part 61 and the input image displaying part 62, and controls the grid lines in the reference image displaying part 61 and the input image displaying part 62 so as to be respectively displayed at the same coordinate positions.

Figure 7C:
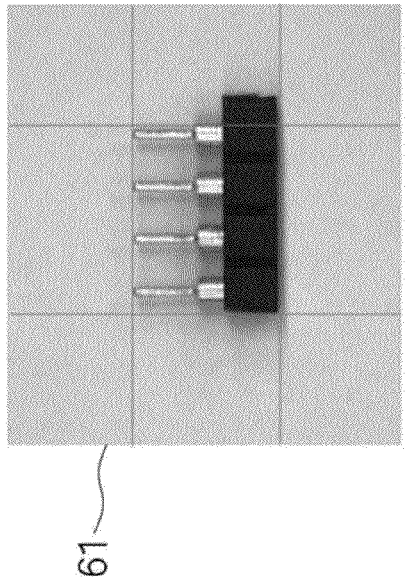
Figure 7D:
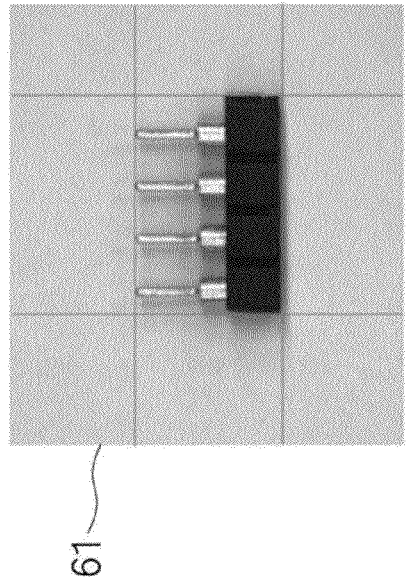

For example, as shown in FIG. 7C, within the reference image displaying part 61, the right-hand grid line in the Y-axis direction is selected by the mouse 52 or the like, and the grid lines are moved such that a position of the selected grid line agrees with a position of the right end of the reference image. In this case, as shown in FIG. 7D, the right-hand grid line in the Y-direction moves likewise also within the input image displaying part 62. Accordingly, by use of the grid lines as auxiliary lines for alignment, it is possible to visually check how much the drawn position of the acquired image is displaced from the drawn position of the reference image.

Figure 8:
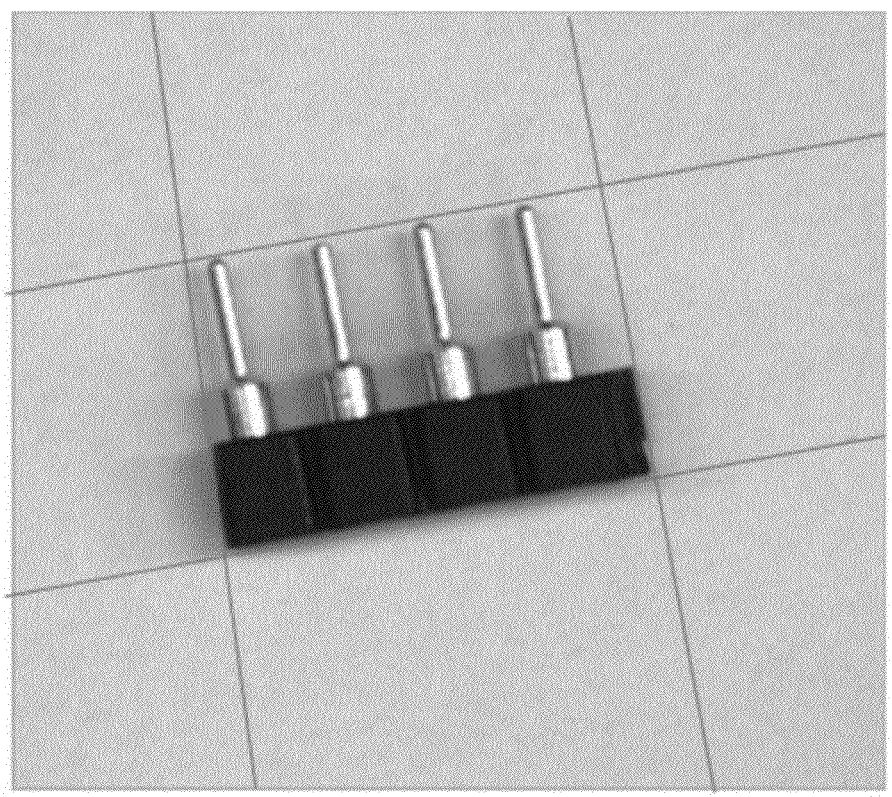
FIG. 8 is an exemplary view of grid lines in the case where an inspection object is tilted.

In addition, the inspection object 6 being imaged as the reference image may have a tilt. In this case, each of the grid lines can be tilted to an arbitrary angle. FIG. 8 is an exemplary view of grid lines in the case of the inspection object 6 being tilted. As shown in FIG. 8, it is possible to tilt the grid lines in accordance with the tilt of the inspection object 6.

Further, when selection of the "contour line" is accepted in the auxiliary line specifying unit 63 of FIG. 6, a contour line of the characteristic portion of the reference image is displayed through use of a known contour extraction algorithm. The displayed contour line is also displayed on the acquired image at the same coordinates, and hence it is possible to visually check positional displacement between the drawn position of the acquired image of the inspection object 6 and the drawn position of the reference image, and a difference in size between the two images surrounded by the contour lines.

Although not shown, in addition to the above-described function, the initial screen for aligning the reference image and the input image shown in FIG. 6 may be added with a function of superimposing and displaying the reference image in a translucent state on the input image displayed in the input image displaying part 62. It is thereby possible to more clearly perform visual checking on positional displacement of the input image with respect to the reference image, and by changing the position of the imaging device 1 or the position of the inspection object 6 while viewing the screen display, it is possible to more easily perform alignment of the input image and the reference image. Further, the function of superimposing and displaying the reference image may be added as a function of the initial screen shown in FIG. 6, or a new superimposed display part (not shown) may be displayed simultaneously with the existing reference image displaying part 61 and the input image displaying part 62.

Figure 9A:
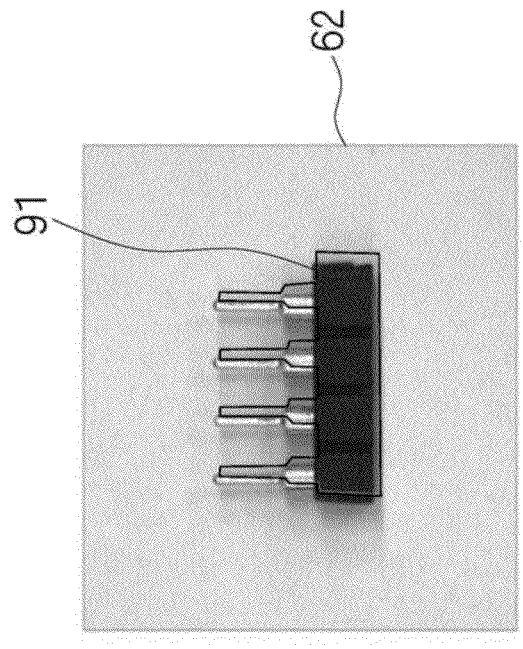
FIGS. 9A and 9B are exemplary views of a positional displacement checking operation for alignment using contour lines.
Figure 9B:
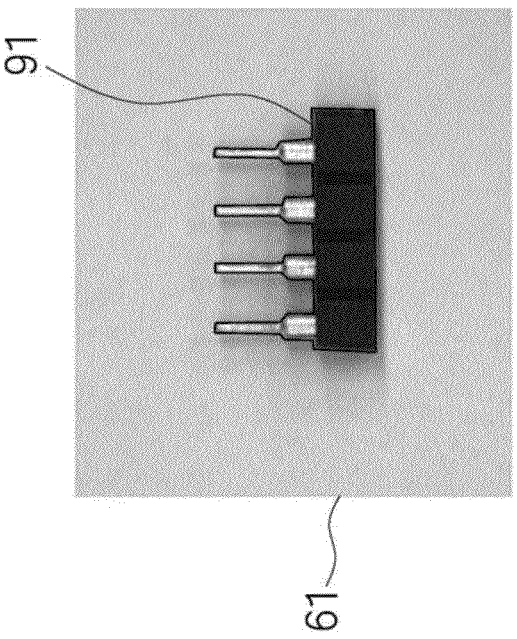

FIGS. 9A and 9B are exemplary views of a positional displacement checking operation for alignment using contour lines. FIG. 9A is an exemplary view of the reference image, and FIG. 9B is an exemplary view of the acquired image of the inspection object 6. Inside the reference image displaying part 61 of FIG. 9A, a contour line 91 of the characteristic portion of the reference image is displayed. The contour line 91 is also displayed in FIG. 9(b) at the same coordinates as those of the reference image displaying part 61, and it is thus found that positional displacement has occurred between the drawn position of the reference image and the drawn position of the acquired input image. That is, a contour line is also displayed in the input image displaying part 62 at the same coordinates as those of positions (coordinate positions inside the reference image displaying part 61) automatically set with respect to the characteristic portion of the inspection object 6 inside the reference image by use of edge processing or the like.

When positional displacement can be identified, the position of the imaging device 1 or the position of the inspection object 6 is changed, to thereby resolve the positional displacement (more specifically, this includes dimensional displacement of the inspection object 6 with respect to the imaged region). Specifically, adjustment is performed on the positional coordinate (X, Y, Z) of the imaging device 1 and a swinging tilt angle θ thereof on the XY plane, or on the positional coordinate (X, Y) of the inspection object 6 and a swinging tilt angle θ thereof on the XY plane, which are shown in FIG. 3.

Returning to FIG. 5, the CPU 21 of the image processing device 2 is adjusted so as to make the brightness of the reference image agree with the brightness of the acquired image (step S505). In the present embodiment, the acquired image of the inspection object 6 is divided into 25 even regions, and a magnitude correlation between an average pixel value of each divided region and an average pixel value of each region in the reference image is determined, to superimpose and display a determination result on the acquired image of the inspection object 6.

Figure 10:
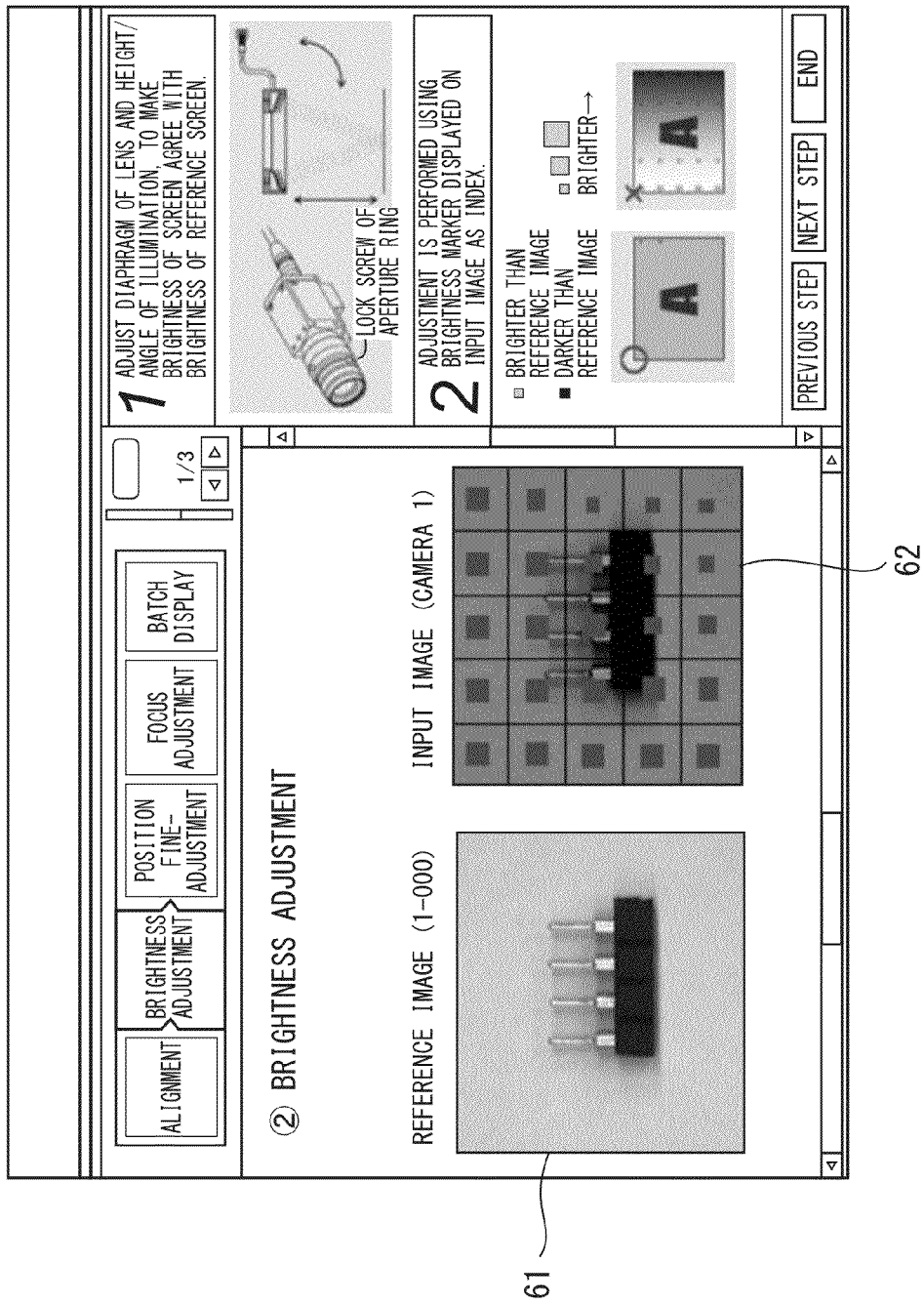
FIG. 10 is a screen image view of a brightness adjustment screen of the image processing device according to the embodiment of the present invention.

FIG. 10 is a screen image view of a brightness adjustment screen of the image processing device 2 according to the embodiment of the present invention. The brightness of the screen is adjusted after alignment of the reference image and the input image described with reference to FIGS. 6 to 9.

In FIG. 10, the reference image is displayed in the reference image displaying part 61 and the acquired input image is displayed in the input image displaying part 62. Needless to say, the input image displayed in the input image displaying part 62 is an input image acquired again from the imaging device 1 by the above-described method in a state where alignment with the reference image has been completed. The brightness of the reference image and the brightness of the acquired image are compared with each other using the average pixel values.

First, the reference image in the reference image displaying part 61 of FIG. 10 is divided into a plurality of even regions, for example, 25 even regions, and an average pixel value as an average value of pixel values of each region is calculated. Next, the input image in the input image displaying part 62 is divided into a plurality of even regions, for example, 25 even regions, and an average pixel value as an average value of pixel values of each region is calculated. That is, the reference image and the input image are divided into the same size inside the respective image displaying parts, and average brightness values are respectively calculated with respect to the divided regions having been divided.

In the input image displaying part 62 of FIG. 10, a brightness indicator is superimposed and displayed with respect to each of the 25 divided regions on the acquired input image. The average pixel value calculated with respect to each region is compared with the average pixel value calculated with respect to each region of the reference image, and when it is smaller than the average pixel value of the reference image, an indicator, e.g., a blue rectangle, indicating the brightness being insufficient, is displayed. A size of the indicator indicates the degree to which the brightness is insufficient, and a larger indicator indicates a higher degree of brightness insufficiency.

Further, the average pixel value calculated with respect to each region is compared with the average pixel value calculated with respect to each region of the reference image, and when it is larger than the average pixel value of the reference image, an indicator, e.g., a red rectangle, indicating the brightness being excessive, is displayed. A size of the indicator indicates the degree to which the brightness is excessive, and a larger indicator indicates a higher degree of brightness excess.

The indicator is not limited to the rectangular display as shown in FIG. 10, and may have another shape, or may be distinguished by its shape instead of its color. Naturally, an amount of difference in average pixel value may be numerically displayed. Further, its display is not limited to be at the center of each region, but it may be displayed anywhere within the region.

In the present embodiment, the inside of the input image displaying part 62 displaying the input image is divided into a size of the obtained average brightness value, and a comparison with the average brightness value of the reference image is made in each divided region, to display the degree of the obtained difference in the input image displaying part 62. Naturally, the present invention is not limited to such a display method, and a method of displaying magnitudes of brightness values respectively in the reference image displaying part 61 and the input image displaying part 62 may be adopted. Although a difference in average brightness value is graphically expressed in the present embodiment, a numerical value may be directly displayed.

When a difference in brightness can be identified, brightness adjustment is performed by changing the rotational position of the aperture ring of the imaging device 1 or the position of the illumination device 4 and the irradiation angle α, or changing the illumination through the illumination controller 41. Specifically, adjustment is performed on the rotational position of the aperture ring of the imaging device 1 or the positional coordinate (X, Y, Z) and the irradiation angle α of the illumination device 4, which are shown in FIG. 3, and adjustment is performed on illumination through the illumination controller 41.

Returning to FIG. 5, after adjustment of the brightness, the CPU 21 of the image processing device 2 respectively generates enlarged images obtained by enlarging the characteristic portions of the acquired image of the inspection object 6 and the reference image, and aligns a drawn position of the reference image and a drawn position of the acquired image based on the generated enlarged images (step S506). The above-described alignment in step S504 is alignment of pixels, and step S506 can be situated as precise alignment focused on the characteristic portion.

Figure 11:
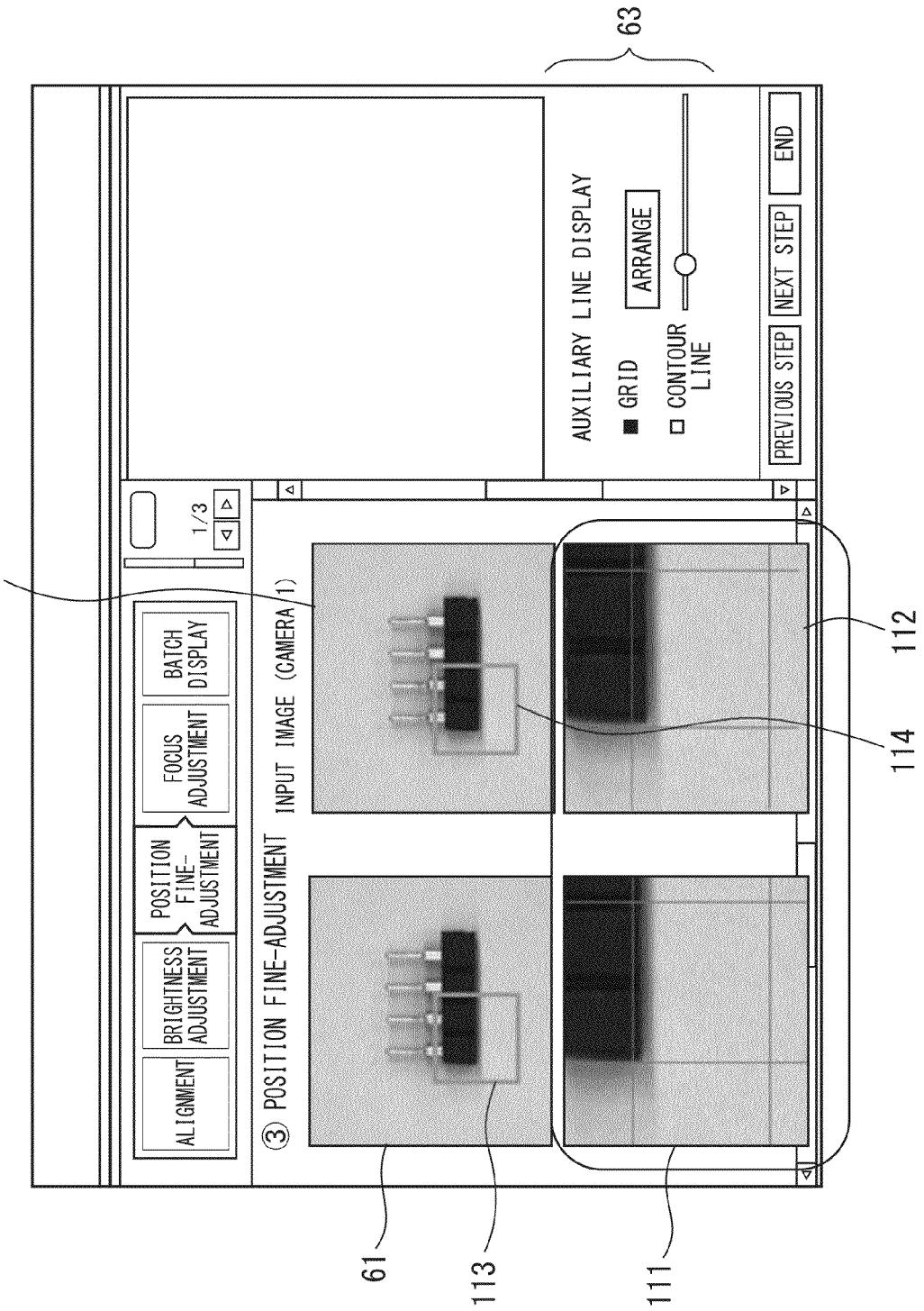
FIG. 11 is a screen image view of a position fine-adjustment screen of the image processing device according to the embodiment of the present invention.

FIG. 11 is a screen image view of a position fine-adjustment screen of the image processing device 2 according to the embodiment of the present invention. In FIG. 11, the reference image is displayed in the reference image displaying part 61 and the acquired image of the inspection object 6 is displayed in the input image displaying part 62. Positional fine-adjustment is performed at the time of completion of brightness adjustment by enlarging and displaying the characteristic portion, designation of which has been accepted.

First, a rectangular designated region 113 is set with respect to the reference image in the reference image displaying part 61 of FIG. 11. When the rectangular designated region 113 is set in the reference image displaying part 61, a rectangular designated region 114 is automatically set at the same coordinates in the input image displaying part 62. The designated region 113 is set by a window setting function which is known in the field of image processing technique, its shape and size can be arbitrarily changed, and it can be set in an arbitrary position desired by the user. Further, in the above embodiment, by setting the designated region 113 in the reference image displaying part 61, the designated region 114 is automatically displayed at the same coordinate positions in the input image displaying part 62. However, conversely, by setting the designated region 113 in the input image displaying part 62, the designated region 114 may be automatically displayed at the same coordinate positions of the reference image displaying part 61.

Then, the image inside the rectangular designated region 113 set in the reference image displaying part 61 of FIG. 11 is enlarged and displayed in an enlarged display part 111 for reference image. Similarly, the image inside the rectangular designated region 114 set in the input image displaying part 62 is enlarged and displayed in an enlarged display part 112 for input image.

The enlarged display function can be realized by displaying only an image inside the region designated by the designated region 113, with respect to the image stored in the storage device 23. At this time, since grid lines displayed as auxiliary lines are also enlarged and displayed at the same positions of the enlarged display parts 111, 112, it is possible to more accurately grasp how much the drawn position of the acquired image of the inspection object 6 is displaced from the drawn position of the reference image, so as to more finely perform alignment.

The auxiliary lines displayed in the enlarged display parts 111, 112 are not limited to the grid lines, and they may be contour lines. Since the contour lines are also enlarged and displayed at the same positions of the enlarged display parts 111, 112, it is possible to more accurately grasp how much the drawn position of the acquired image of the inspection object 6 is displaced from the drawn position of the reference image.

Further, since the sizes of the enlarged display parts 111, 112 are constant, enlargement factors of the enlarged images displayed in the enlarged display parts 111, 112 vary depending on sizes of the rectangular designated regions 113, 114. That is, when the sizes of the rectangular designated regions 113, 114 are increased, the ranges of the images displayed in the enlarged display parts 111, 112 become wider, and the enlargement factors thus become smaller. On the contrary, when the sizes of the rectangular designated regions 113, 114 are decreased, the ranges of the images displayed in the enlarged display parts 111, 112 become narrower, and the enlargement factors thus become larger.

When positional displacement can be identified, the position of the imaging device 1 or the position of the inspection object 6 is changed, to thereby resolve the positional displacement. Specifically, adjustment is performed on the positional coordinate (X, Y, Z) of the imaging device 1 and a swinging tilt angle θ thereof on the XY plane, or on the positional coordinate (X, Y) of the inspection object 6 and a swinging tilt angle θ thereof on the XY plane, which are shown in FIG. 3.

Returning to FIG. 5, the CPU 21 of the image processing device 2 is adjusted so as to make the focus on the reference image agree with the focus on the acquired image (step S507). The focus adjustment part 406 respectively generates enlarged images obtained by enlarging characteristic portions of the acquired image of the inspection object 6 and the reference image, and performs adjustment so as to make edge strength of the enlarged image of the acquired image agree with edge strength of the enlarged image of the reference image.

Figure 12:
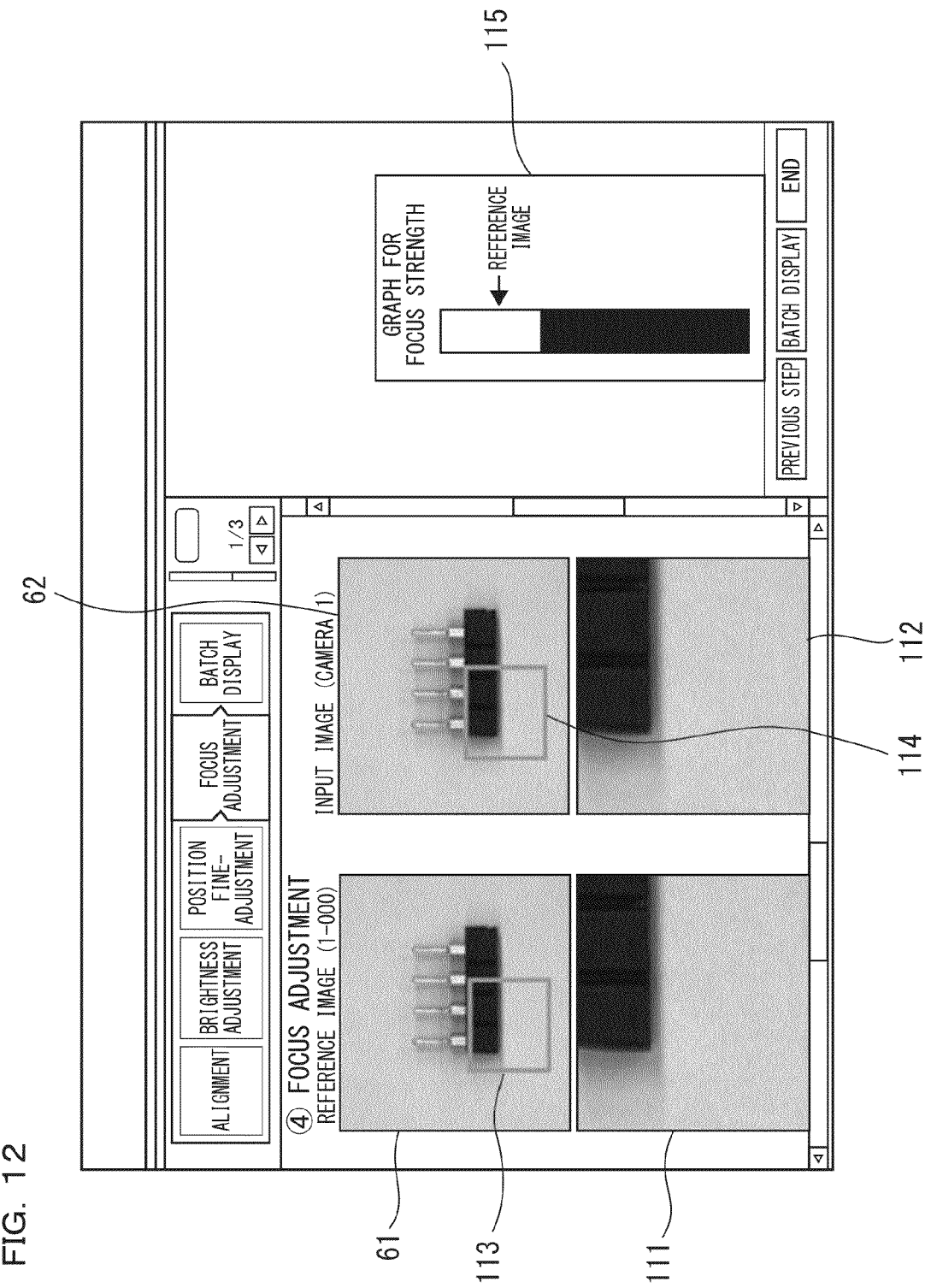
FIG. 12 is a screen image view of a focus adjustment screen of the image processing device according to the embodiment of the present invention.

FIG. 12 is a screen image view of a focus adjustment screen of the image processing device 2 according to the embodiment of the present invention. In FIG. 12, the reference image is displayed in the reference image displaying part 61 and the acquired image of the inspection object 6 is displayed in the input image displaying part 62. Since brightness adjustment has been completed similarly to the positional fine-adjustment, focus adjustment is performed by enlarging and displaying the characteristic portion, designation of which has been accepted, by use of the enlarged display parts 111, 112.

First, the rectangular designated region 113 is set with respect to the reference image in the reference image displaying part 61 of FIG. 12. When the rectangular designated region 113 is set in the reference image displaying part 61, a rectangular designated region 114 is automatically set at the same coordinates in the input image displaying part 62.

In the present embodiment, the designated region 113 once set in FIG. 11 is cancelled after position fine-adjustment (precise positioning), and the designated region 113 is re-set in the focus adjustment process. However, in the case of performing focus adjustment subsequently to the precise positioning process, it is preferable to continue to use the designated region 113 set in the precise positioning. When the designated region 113 needs to be reset, the rectangular region may be moved and reset.

Then, the image inside the rectangular designated region 113 set in the reference image displaying part 61 of FIG. 12 is enlarged and displayed in the enlarged display part 111 for reference image. Similarly, the image inside the rectangular designated region 114 set in the input image displaying part 62 is enlarged and displayed in an enlarged display part 112 for input image.

Next, based on the reference image enlarged and displayed in the enlarged display part 111 for reference image, edge strength of the characteristic portion of the inspection object 6 is calculated with respect to each of the X-axis direction and the Y-axis direction of the reference image. The maximum value of the calculated edge strength is displayed in a focus strength displaying region 115 as focus strength of the reference image.

Then, also for the acquired image of the inspection object 6, edge strength of the characteristic portion of the inspection object 6 is calculated with respect to each of the X-axis direction and the Y-axis direction of the image. The maximum value of the calculated edge strength is displayed in the focus strength displaying region 115 as focus strength of the image of the inspection object.

Focus adjustment is performed such that the calculated focus strength of the image agrees with the focus strength of the reference image. Specifically, a rotational position of the focus ring of the imaging device 1 shown in FIG. 3 is adjusted.

As described above, according to the present embodiment, even in a case where there is a difference in a state of illumination, a mounted position of the imaging device 1, displacement of its posture, adjustment of a diaphragm or a focus of a lens, or the like, from the time when the reference image has been obtained by imaging, it is possible to reliably reproduce the imaging environment of the time when the reference image has been obtained by imaging, so as to make a defective/non-defective determination with high accuracy on the inspection object 6.

In the above embodiment, adjustment of the imaging environment is performed in the order of "alignment", "brightness adjustment", "position fine-adjustment", and "focus adjustment". As basic requirements, "brightness adjustment" may be performed after "alignment", and "focus adjustment" may be performed after "brightness adjustment". For this reason, adjustment may be performed in the order of "alignment", "position fine-adjustment", "brightness adjustment", and "focus adjustment", in addition to the order of the above embodiment.

In addition, the present invention is not limited to the above embodiment, and a variety of changes, modifications, and the like can be made as long as it is within the scope of the gist of the present invention. For example, the imaging device 1 and the image processing device 2 are not limited to the form of being directly connected through the connection cable 3, and needless to say, the imaging device 1 and the image processing device 2 may be connected via a network such as a LAN or a WAN.

What is claimed is:

1. An image processing device, which is connected with an imaging unit for imaging an inspection object, and performs imaging processing on image data captured by the imaging unit, to make a defective/non-defective determination on the inspection object based on a result of the image processing, the device comprising:

a reference image storing unit for storing a reference image to serve as a reference for a non-defective inspection object in the defective/non-defective determination in association with identification information for identifying the inspection object;

an image displaying unit for acquiring an image of the inspection object from the imaging unit, and displaying the acquired image side by side with the reference image of corresponding identification information;

an alignment unit for aligning a drawn position of the acquired image in the image displaying unit so as to adjust a position displacement between the drawn position of the acquired image and the drawn position of the reference image;

a brightness adjustment unit for calculating a brightness of the acquired image and a brightness of the reference image, and superimposing on the acquired image displayed on the image displaying unit, based on the calculated result, comparison information comprising a brightness indicator or a numerical value for comparing the brightness of the acquired image with the brightness of the reference image so as to adjust a brightness difference between the acquired image and the reference image; and a focus adjustment unit for performing adjustment so as to adjust focus difference between the acquired image and the reference image.

2. The image processing device according to claim 1, wherein grid lines are superimposed and displayed on the displayed reference image, and the alignment unit moves the grid lines over a characteristic portion of the reference image, and superimposes and displays grid lines on the acquired image at the same coordinates.

3. The image processing device according to claim 1, wherein
a contour line for contouring is superimposed and displayed on the displayed reference image, and
the alignment unit displays the contour line over a characteristic portion of the reference image, and superimposes and displays a contour on the acquired image at the same coordinates.

4. The image processing device according to claim 1, wherein the brightness adjustment unit divides the acquired image into a plurality of even regions, and superimposes and displays on the acquired image a magnitude correlation between an average pixel value of each of the regions and an average pixel value of each of regions in the reference image.

5. The image processing device according to claim 1, wherein
the focus adjustment unit respectively generates enlarged images obtained by enlarging characteristic portions of the acquired image and the reference image, and performs adjustment so as to make edge strength of the enlarged image of the acquired image coincide with edge strength of the enlarged image of the reference image.

6. The image processing device according to claim 1, comprising
a position fine-adjustment unit for respectively generating enlarged images obtained by enlarging characteristic portions of the acquired image and the reference image, and aligning a drawn position of the reference image and a drawn position of the acquired image based on the generated enlarged images.

7. An image processing method, which is executable by an image processing device, which is connected with an imaging unit for imaging an inspection object, and performs imaging processing on image data obtained by imaging by the imaging unit, to make a defective/non-defective determination on the inspection object based on a result of the image processing, the method comprising the steps of:
storing a reference image to serve as a reference for a non-defective determination in association in the defective/non-defective determination with identification information for identifying the inspection object;
acquiring an image of the inspection object from the imaging unit, and displaying the acquired image side by side with the reference image of corresponding identification information;
aligning a drawn position of the reference image and a drawn position of the acquired image so as to adjust a positional displacement between the drawn position of the reference image and the drawn position of the acquired image;
calculating a brightness of the acquired image and a brightness of the reference image, and superimposing on the acquired image displayed on the image displaying unit, based on the calculated result, comparison information comprising a brightness indicator or a numerical value for comparing the brightness of the reference image with the brightness of the acquired image so as to adjust a brightness difference between the acquired image and the reference image; and
performing adjustment so as to adjust focus difference between the reference image and the acquired image.

8. The image processing method according to claim 7, wherein
in the image processing device,
grid lines are superimposed and displayed on the displayed reference image, and
the grid lines are moved over a characteristic portion of the reference image, and grid lines are superimposed and displayed on the acquired image at the same coordinates.

9. The image processing method according to claim 7, wherein
in the image processing device,
a contour line for contouring is superimposed and displayed on the displayed reference image, and
the contour line is displayed over a characteristic portion of the reference image, and a contour is superimposed and displayed on the acquired image at the same coordinates.

10. The image processing method according to claim 7, wherein
in the image processing device,
the acquired image is divided into a plurality of even regions, and a magnitude correlation between an average pixel value of each of the regions and an average pixel value of each of regions in the reference image is superimposed and displayed on the acquired image.

11. The image processing method according to claim 7, wherein
in the image processing device,
enlarged images obtained by enlarging characteristic portions of the acquired image and the reference image are respectively generated, and
adjustment is performed so as to make edge strength of the enlarged image of the acquired image coincide with edge strength of the enlarged image of the reference image.

12. The image processing method according to claim 7, wherein
in the image processing device,
enlarged images obtained by enlarging characteristic portions of the acquired image and the reference image are respectively generated, and
a drawn position of the reference image and a drawn position of the acquired image are aligned based on the generated enlarged images.

13. The image processing device according to claim 1, wherein said comparison information is a brightness indicator which indicates a magnitude correlation between a specified pixel value in the acquired image and a specified pixel value in the reference image.

14. The image processing device according to claim 1, wherein said comparison information is an amount of difference in average pixel value.

15. The image processing device according to claim 1, wherein said comparison information is a magnitude of brightness values in the reference image and the acquired image.

* * * * *

UNITED STATES PATENT AND TRADEMARK OFFICE
CERTIFICATE OF CORRECTION

| | | |
|---|---|---|
| PATENT NO. | : 9,002,094 B2 | Page 1 of 1 |
| APPLICATION NO. | : 13/684652 | |
| DATED | : April 7, 2015 | |
| INVENTOR(S) | : Aruto Hirota | |

It is certified that error appears in the above-identified patent and that said Letters Patent is hereby corrected as shown below:

Title page item (73)

Please correct the spelling of the Assignee from "Kenyence Corporation" to --Keyence Corporation--.

IN THE CLAIMS:

Claim 1, column 14, line 44, "position" should read --positional--.

Signed and Sealed this
Twenty-ninth Day of September, 2015

Michelle K. Lee
*Director of the United States Patent and Trademark Office*